US007187908B2

(12) United States Patent
Fujisawa et al.

(10) Patent No.: US 7,187,908 B2
(45) Date of Patent: Mar. 6, 2007

(54) WRIST-WATCH DEVICE HAVING COMMUNICATION FUNCTION, INFORMATION DISPLAY METHOD, CONTROL PROGRAM, AND RECORDING MEDIUM

(75) Inventors: Teruhiko Fujisawa, Shiojiri (JP); Hiroyuki Chihara, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 613 days.

(21) Appl. No.: 10/026,172

(22) Filed: Dec. 21, 2001

(65) Prior Publication Data

US 2002/0081976 A1 Jun. 27, 2002

(30) Foreign Application Priority Data

Dec. 25, 2000 (JP) ............................ 2000-393633
Oct. 9, 2001 (JP) ............................ 2001-311493

(51) Int. Cl.
*H04B 1/40* (2006.01)

(52) U.S. Cl. ......................... 455/88; 702/179; 340/5.1; 340/5.61; 368/10; 368/108; 360/10

(58) Field of Classification Search ............. 455/343.2, 455/343.4, 343.5, 69, 68, 88; 368/13, 46, 368/47, 108; 340/5.1, 5.61, 825; 702/179; 360/10
See application file for complete search history.

(56) References Cited

U.S. PATENT DOCUMENTS 4,223,522 A * 9/1980 Nomura et al. ............... 368/66
5,475,377 A * 12/1995 Lee ............................ 340/5.9
5,572,488 A 11/1996 Yamada et al.
6,335,906 B1 * 1/2002 Engelmann .................. 368/10
6,359,837 B1 * 3/2002 Tsukamoto .................. 368/10
6,392,613 B1 * 5/2002 Goto ........................... 345/30
6,449,583 B1 * 9/2002 Sakumoto et al. .......... 702/179
6,489,883 B1 * 12/2002 Iiyama et al. ................ 340/5.1

FOREIGN PATENT DOCUMENTS

EP 0 919 959 A1 6/1999
JP 62-130376 6/1987
JP 2-300886 12/1990
JP 6-66963 3/1994
JP 7-65212 3/1995
JP 7-306275 11/1995
JP 9-105787 4/1997
JP 09-311920 12/1997
JP 2000-286761 10/2000

* cited by examiner

*Primary Examiner*—Jean Gelin
*Assistant Examiner*—Pierre-Louis Desir
(74) *Attorney, Agent, or Firm*—Mark P. Watson

(57) ABSTRACT

A user can easily identify the content of data (the value or the state of the data), such as a credit balance, stored in a contactless IC module provided in a wrist-watch device having a communication function. A timepiece control unit 14 of a timepiece module 10 transmits a confirmation command for the data, such as the credit balance, to a contactless IC module 60 every determination cycle period TSP, and receives the data stored in the contactless IC module 60. When the value of the stored data (for example, the amount of balance) becomes smaller than a predetermined value, the timepiece control unit 14 causes a second hand to perform an irregular movement noticeably different from the regular timing movement. Accordingly, the user is able to easily identify the data content (for example, insufficient balance).

17 Claims, 12 Drawing Sheets

DATA FORMAT

| | |
|---|---|
| PERSONAL ID | ######### |
| BALANCE DATA Da | ********* |
| SERVICE PROVIDER ID | $$$$$$$$ |
| • • • | • • • |

FIG._6

WRIST-WATCH DEVICE HAVING COMMUNICATION FUNCTION, INFORMATION DISPLAY METHOD, CONTROL PROGRAM, AND RECORDING MEDIUM

BACKGROUND OF THE INVENTION

1. Field of the Invention

The present invention relates to a wrist-watch device having a wireless communication function. The present invention is provided with a contactless IC module. It is suitable for use as, or to function as, a prepaid card, which can be used, for example, as a ticket for an automatic ticket machine. The present invention also relates to an information display method, a control program, and a recording medium for such wrist-watch device.

2. Description of the Related Art

Automatic ticket systems for transportation facilities, which are in widespread use, uses tickets, e.g. commuter tickets, on which various information is magnetically recorded.

In this automatic ticket system, a user is required to perform a physical action, such as inserting a ticket into an entrance slot, when passing through the ticket gate of the automatic ticket machine, and then receiving the ticket discharged from an exit slot after passing through the ticket gate. In this system, since all users must individually perform this action, the flow of the users passing through the automatic ticket machine becomes congested, and in particular, during rush-hours, the area near the automatic ticket machine becomes very crowded.

Moreover, a mechanical feeding mechanism for feeding tickets from the entrance slot to the exit slot is provided for the automatic ticket machine. This mechanical feeding mechanism is subject to failure or maintenance problems that greatly exacerbate delay in the flow of commuters.

Accordingly, in order to improve the ease of use for users when they are passing through the automatic ticket machine, and to reduce the occurrence of failure of the automatic ticket machine, a contactless automatic ticket system using a contactless IC module as a ticket for transmitting and receiving information by wireless communication has been proposed. In some ski resorts, a system using a contactless IC module as a lift pass has already been put into practical use.

This type of ticket is provided with a loop antenna, and an IC chip having a communication unit, a control unit, and a storage unit. Ticket information, such as the boarding zone and the expiry date, is stored in the storage unit.

The contactless automatic ticket machine includes an antenna, and a controller that transmits and receives the ticket information to and from the ticket.

In this contactless automatic ticket system, if the distance between the antenna of the automatic ticket machine and the antenna of the ticket is within 10 cm, wireless transmission and reception is possible, and thus, the information can be transmitted and received as the user passes through the ticket gate of the automatic ticket machine. This enables the user to pass through the automatic ticket machine even if the ticket remains in a pocket, a bag, or a wallet.

However, when the above-described contactless IC module is used as a prepaid card, for example, as a train ticket, the user cannot check the balance or amount of credit remaining on the card. Accordingly, the ease of use of the card is lessened for the user.

For example, if the user attempts to pass through the automatic ticket gate without being aware that the balance is less than the minimum fare, the automatic ticket machine recognizes that the balance is insufficient, and closes the gate.

OBJECT OF THE INVENTION

Accordingly, in view of the above-described problems, an object of the present invention is to provide a wrist-watch device having a wireless communication function, which enables a user to check data values, such as the balance, stored in a contactless IC module provided in the wrist-watch device, and also to provide an information display method, a control program, and a recording medium for the a wrist-watch device having a wireless communication function.

SUMMARY OF THE INVENTION

According to the present invention, a wrist-watch device has a communication function, and includes a timepiece module having a time display member, which is mechanically driven, so as to display the time, and a wireless communication circuit for transmitting and receiving data to and from an external wireless device by wireless communication, and the wireless communication circuit includes memory for storing. The wrist-watch device includes a timepiece control unit which causes the time display member to display information in accordance with the data stored in the wireless communication circuit.

The timepiece control unit mechanically drives the time display member to perform the display operation for displaying the information in accordance with the data stored in the wireless communication circuit.

In this case, the wrist-watch device may further include a comparator unit for comparing a value of the stored data with a value of predetermined data, and for generating comparison result data. The timepiece control unit may display information in accordance with the comparison result data.

The timepiece control unit may cause a second hand that forms the time display member to perform an irregular movement different from a regular movement in accordance with the comparison result data.

The wireless communication circuit may transmit to the external wireless device a communication enable signal indicating that the wireless communication is to be performed with the external wireless device upon receiving a polling signal which is transmitted from the external wireless device.

The timepiece control unit may start the display operation in response to activation of a switch provided in a housing of the wrist-watch device.

The timepiece control unit may move a second hand that forms the time display member from an initial position at which the second hand is located by a predetermined distance while performing the display operation.

The timepiece control unit may move a second hand that forms the time display member to a predetermined position while performing the display operation.

The time display member may include a first dial for displaying at least the day of the week or the day of the month, and the timepiece control unit may display the information corresponding to the stored data on the first dial.

As the time display member, a second dial, separately provided from a dial for displaying the time, for displaying the day of the week or the day of the month may be provided, and the timepiece control unit may display the information corresponding to the stored data on the second dial.

As the time display member, a stop-watch indicator hand and a stop-watch dial for displaying the measured time may be provided, and the information corresponding to the stored data may be displayed by using the stop-watch indicator hand and the stop-watch dial.

The timepiece control unit may perform the display operation when the value of the stored data becomes smaller than the value of the predetermined data, and the value of the predetermined data may be updated based on an updating signal transmitted from the external wireless device.

The wireless communication circuit may include an IC chip having a communicator for modulating and demodulating the data, a controller for controlling individual elements, and a storage portion for storing the data.

The timepiece module may restart to display the time after performing the display operation for a predetermined period.

The wireless communication circuit may include a power supply voltage generator for receiving a signal from the external wireless device and for generating a power supply voltage from the received signal, and the timepiece control unit may read the data from the wireless communication circuit by using a power source of the timepiece module.

The wireless communication circuit may store prepaid card data as the stored data, and may provide a prepaid card function.

The present invention also provides an information display method for use in a wrist-watch device having a communication function. The wrist-watch device includes: a timepiece module including a time display member, which is mechanically driven, so as to display the time; and a wireless communication circuit for transmitting and receiving data to and from an external wireless device by wireless communication, and includes memory for storing. The information display method includes the steps of: reading the data from the wireless communication circuit in response to an instruction signal; and performing a display operation for displaying information in accordance with the stored data using the time display member.

In this case, the information display method may include the step of causing a second hand that forms the time display member to perform an irregular movement perceptively different from a regular movement while the display operation is performed.

A switch may be provided on the wrist-watch device, and the wrist-watch device may include the step of generating the instruction signal upon detecting a predetermined operation performed on the switch.

The information display method may include the step of restarting time display after performing the display operation for a predetermined period.

The present invention also provides recording medium for storing a control program executable by a computer for controlling a wrist-watch device having a communication function. The wrist-watch device includes: a timepiece module including a time display member, which is mechanically driven, so as to display the time; and a wireless communication circuit for transmitting and receiving data to and from an external wireless device by wireless communication, and including memory for storing the data. The control program causes the wrist-watch device to detect an instruction from an external source and to read the data from the wireless communication circuit based on the instruction, and causes the time display member to perform a display operation for displaying information in accordance with the data.

In this case, a second hand that forms the time display member may be operated to perform an irregular movement different from a regular movement while the display operation is performed.

The instruction may be detected by detecting a predetermined operation performed on a switch provided on the wrist-watch device.

The display of the time may be restarted after the display operation is performed for a predetermined period.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 6 illustrates the data format stored in a non-volatile memory.

DESCRIPTION OF THE PREFERRED EMBODIMENTS

Embodiments of the present invention are described below with reference to the drawings.

First Embodiment

Figure 1:
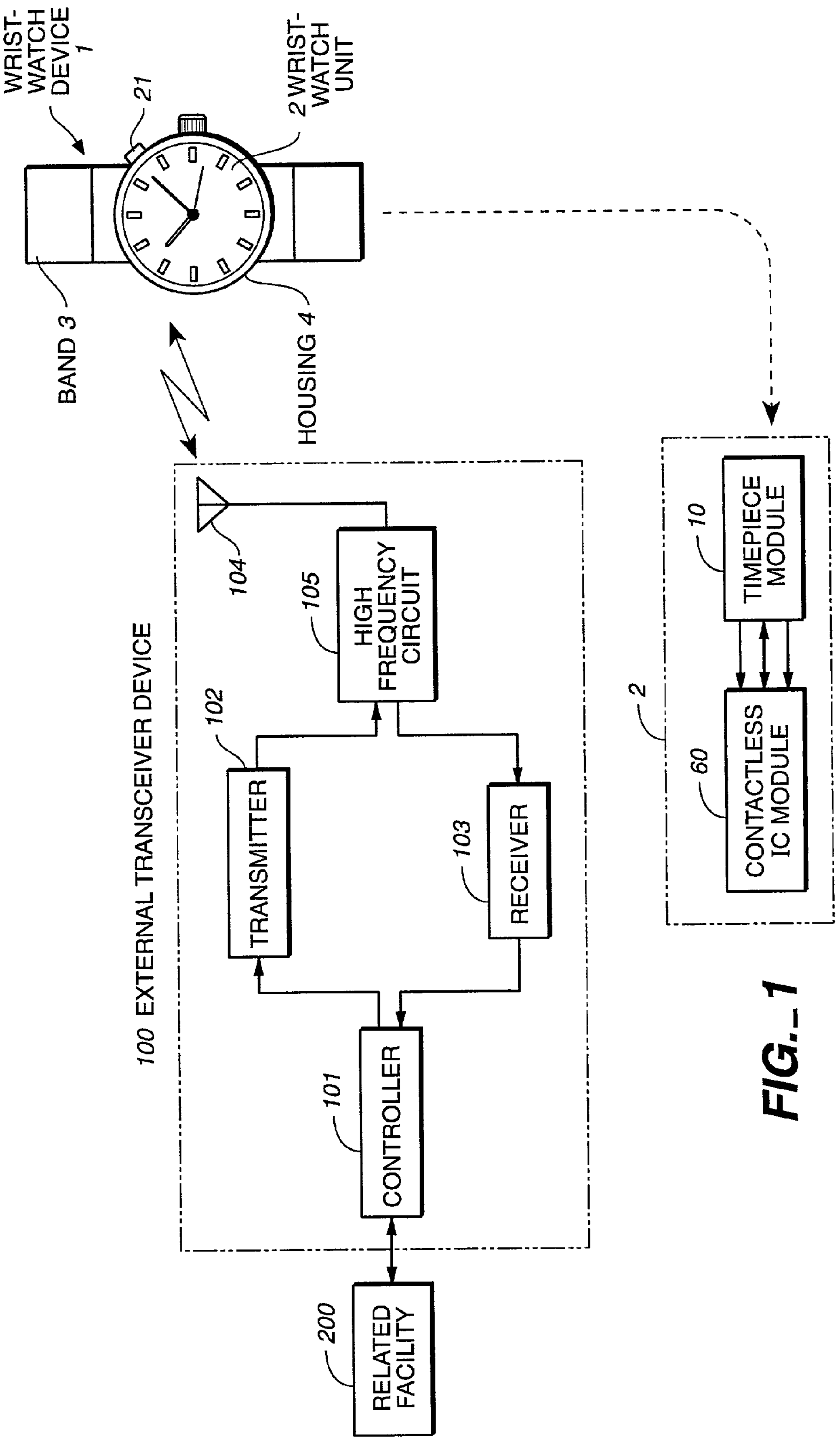
FIG. 1 is an overall block diagram illustrating a system using a wrist-watch device having a wireless communication function according to a first embodiment of the present invention.

FIG. 1 is a block diagram illustrating a system using a wrist-watch device 1 having a wireless communication function (hereinafter referred to as the "wrist-watch device 1") according to a first embodiment of the present invention. This system in its entirety would include many wrist-watch devices 1 worn by many users and a plurality of external transceiver devices 100 located at various places (only one of the wrist-watch devices 1 and one of the transceiver devices 100 are shown for clarity).

Configuration of External Transceiver Device

The external transceiver device 100 includes a controller 101 for controlling the individual elements in device 100, a transmitter 102 for generating a transmitting signal under the control of the controller 101 and outputting it to the high frequency circuit 105, a receiver 103 for demodulating a received signal (transmitted from the wrist-watch device 1) into received data and outputting it to the controller 101, and a high frequency circuit 105 for transmitting and receiving a data signal to and from the wrist-watch device 1 via an antenna 104.

The controller 101 contains an encryption processing unit (not shown) for encrypting and decrypting the signal transmitted and received to and from the wrist-watch device 1.

The transmitter 102 receives the signal from the controller 101, and generates the transmitting signal having a frequency of, for example, 13.56 MHz. This frequency is suitable for short-distance communication in a range of approximately from 2 to 19 centimeters. When the user brings his/her wrist-watch device 1 within a few centimeters (for example, within 10 cm) of the antenna 104 of the external transceiver device 100, data communication is performed between the external transceiver device 100 and the wrist-watch device 1.

A related facility 200 is formed of various processors (not shown) that are connected via a network in the facility, and is managed by a service provider that offers services to the user of the wrist-watch device 1.

For example, if the service provider is a railway organization, the related facility 200 includes a database for storing fares for individual stations, a processor for calculating the fare that the user must pay based on the information stored in the database, a processor for executing accounting processing for the user based on the calculated fare, a network for connecting these elements, and so on.

The above-described database and the processors may be physically located in a physical storage unit (e.g. cabinet or housing) of each external transceiver device 100.

The related facility 200 also includes a movable barrier for preventing users who have insufficient fare from passing through the ticket gate, and a opening/closing mechanism for opening or closing the barrier.

The external transceiver device 100 performs data communication with the wrist-watch device 1 according to short-distance wireless communication while also performing data communication with the connected related facility 200. With this arrangement, the external transceiver device 100 transmits and receives service-related information to and from the wrist-watch device 1.

For example, if the service provider is a railway organization, the external transceiver device 100 is integrated into a ticket selling machine or an automatic ticket machine installed in each station. Upon receiving money from the user, the external transceiver device 100 integrated into the ticket selling machine transmits the corresponding payment information to the wrist-watch device 1. Subsequently, when the user passes through the ticket gate, the external transceiver device 100 integrated into the automatic ticket machine calculates the fare by performing data communication with the wrist-watch device 1. Then, the payment information corresponding to the calculated fare is obtained from the wrist-watch device 1. Various communication protocols for short-distance communication may be used between the external transceiver device 100 and the wrist-watch device 1.

Configuration of Wrist-watch Device

Figure 2:
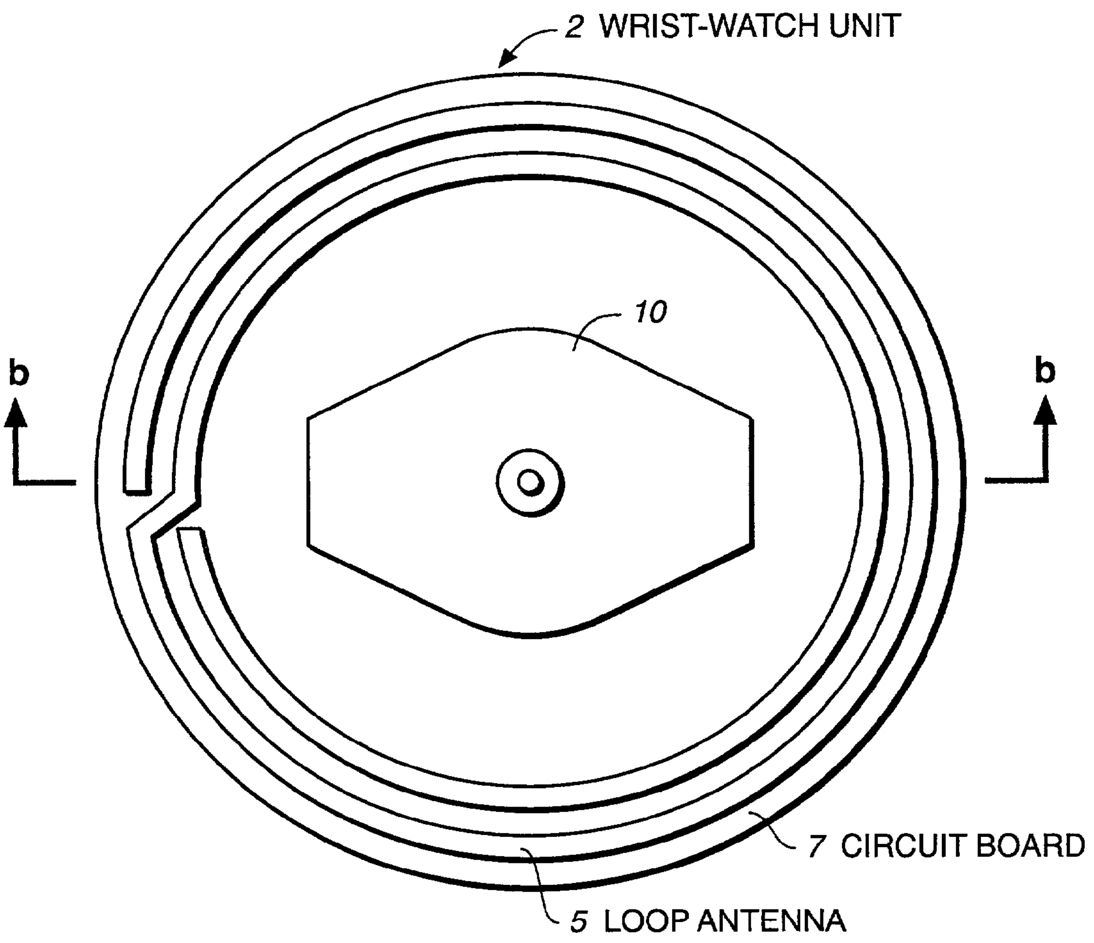
FIG. 2 illustrates a wrist-watch unit of the wrist-watch device according to the same embodiment.
Figure 3:
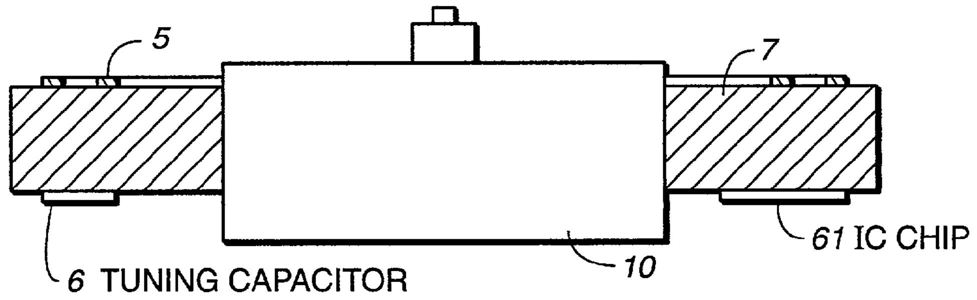
FIG. 3 is a cross sectional view taken along line b—b of FIG. 2.

FIG. 2 illustrates a wrist-watch unit of the wrist-watch device. FIG. 3 is a cross sectional view taken on line b—b of FIG. 2.

The wrist-watch device 1 includes a wrist-watch unit 2 and a band 3. Within a housing 4 of the wrist-watch unit 2, as shown in FIGS. 2 and 3, a timepiece module 10 is located at the central portion, and a generally ring-like contactless IC module 60 (FIG. 1) is disposed around the outer periphery of the timepiece module 10. This contactless IC module 60 includes a circuit board 7, an IC chip 61, a loop antenna 5, and a tuning capacitor 6, which are mounted on the circuit board 7.

Configuration of Timepiece Module

Figure 4:
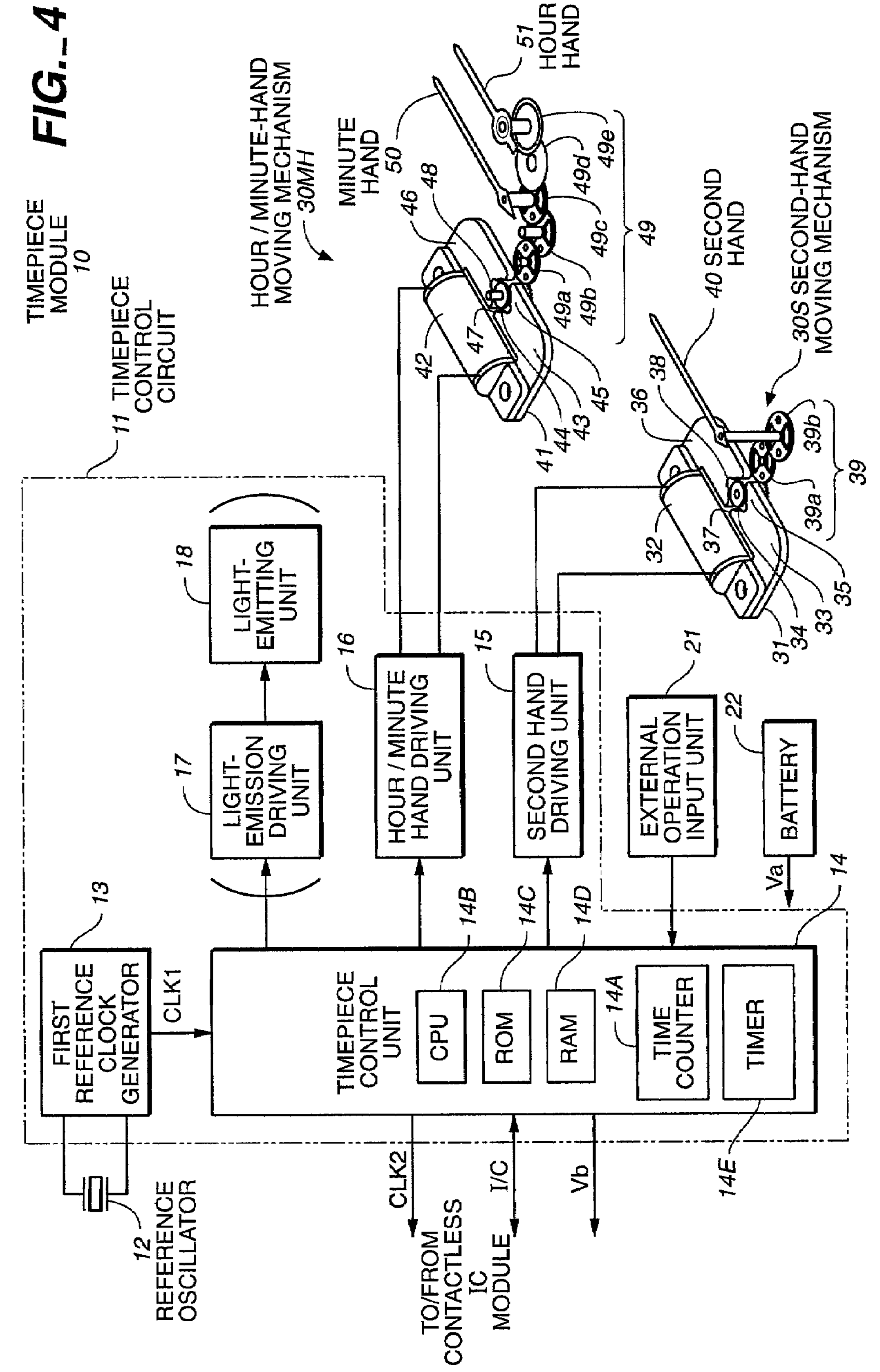
FIG. 4 is a block diagram illustrating a timepiece module of the wrist-watch device according to the same embodiment.

FIG. 4 is a block diagram illustrating the configuration of the timepiece module of the time wrist-watch.

The timepiece module 10 includes, as shown in FIG. 4, a timepiece control circuit 11, a reference oscillator 12, an external operation input unit 21, such as a crown or a credit balance display switch (see FIG. 1), a battery 22 for supplying a power supply voltage Va, and moving mechanisms 30S and 30MH.

The timepiece control circuit 11 comprises primarily a first reference clock generator 13, a timepiece control unit 14, a second-hand driving unit 15, and an hour/minute-hand driving unit 16.

The first reference clock generator 13 receives a reference clock signal from the reference oscillator 12 so as to generate a first reference clock CLK1 (for example, 32.768 kHz).

The timepiece control unit 14 comprises a microcomputer including a CPU 14B, a ROM 14C, a RAM 14D, and other common elements of a microcomputer, as are well known.

The ROM stores a program for controlling the second-hand driving unit 15 and the hour/minute-hand driving unit 16 using a time signal generated based on the first reference clock CLK1. The ROM also stores a program for performing second-reference signal generation processing by receiving a signal from the contactless IC module 60 or an operation performed on the external operation input unit 21 and by generating a second reference clock signal CLK2 having a frequency of, for example, 1.0 MHz, and for supplying it to the contactless IC module 60. A program for performing determination processing for determining the credit balance data of the contactless IC module 60 (insufficient-balance reporting processing in the mode of use discussed below) is also stored in the ROM.

The RAM stores determination data D0 used for this determination processing. If the contactless IC module 60 is used for a prepaid ticket function, it is preferable in a practical sense that this determination data D0 corresponds to the minimum fare.

Additionally, a suitable communication interface may be connected to an input/output terminal (not shown) of the timepiece control unit 14, in which case, a control program for performing the method of the present invention can be downloaded and installed via a network, such as the Internet. Via such a communication interface, a control program recorded on a removable recording medium, such as a flexible disk or an optical disc, may be installed.

As the insufficient-balance reporting processing, power-voltage supply processing, irregular movement processing, etc. may be employed. According to the power-voltage supply processing, the power supply voltage Va from the battery 22 is transformed to power a supply voltage Vb, and is supplied to the contactless IC module 60, thereby driving the contactless IC module 60. The irregular movement processing is as follows. The value of balance data Da read from the contactless IC module 60 is compared with the value of the predetermined data D0, and upon receiving the comparison result, the second-hand moving mechanism 30S changes the duty of the pulse signal, resulting in a three-second movement. The timepiece control unit 14 includes a comparator unit that may comprise the CPU 14B that is programmed to compare the two values and provide a comparison result as described.

In this case, the power supply voltage Va is generated using, for example, a high potential voltage as the reference potential (GND) and a low potential voltage as the supply voltage. A light-emission driving unit 17 receives a determination signal output from the timepiece control unit 14, and causes a light-emitting unit 18, which is separately provided for the wrist-watch unit 1, to emit light.

The configurations of the moving mechanisms 30S and 30MH are discussed below.

The second-hand moving mechanism 30S includes a stepping motor 31 that may be a pulse motor, a stepper motor, or a digital motor. The stepping motor 31 is driven by a driving pulse signal.

The stepping motor 31 includes a driving coil 32 which generates a magnetic force in accordance with the driving pulse signal supplied from the second-hand driving unit 15, a stator 33 excited by the driving coil 32, and a rotor 34 that rotates by a magnetic field excited within the stator 33.

The rotor 34 is a PM type having a disk-like bipolar permanent magnet (permanent-magnet rotary type). The stator 33 is provided with a magnetic saturating portion 37 in which different magnetic poles resulting from the magnetic force generated in the driving coil 32 are generated in corresponding phases (poles) 35 and 36 around the rotor 34.

In order to define the rotating direction of the rotor 34, an internal notch 38 is provided at a suitable position of the inner periphery of the stator 33. A cogging torque is generated by this internal notch 38 so as to stop the rotor 34 at a suitable position.

The rotation of the rotor 34 of the stepping motor 31 is conveyed to a second hand 40 by a gear train 39 including an intermediate second date wheel 39*a*, which is meshed with the rotor 34, and a second wheel (second designating wheel) 39*b*. As a result, seconds are displayed by the second hand 40.

Substantially similar to the above-described second-hand moving mechanism 30S, the hour/minute-hand moving mechanism 3OHM includes a stepping motor 41, a driving coil 42, a stator 43, and a rotor 44.

The stator 43 is provided with a magnetic saturating portion 47 in which different magnetic poles resulting from the magnetic force generated in the driving coil 42 are generated in corresponding phases (poles) 45 and 46 around the rotor 44.

In order to define the rotating direction of the rotor 44, an internal notch 48 is provided at a suitable position of the inner periphery of the stator 43. A cogging torque is generated by this internal notch 48 so as to stop the rotor 44 at a suitable position.

The rotation of the rotor 44 of the stepping motor 41 is then conveyed to the corresponding hands by a gear train 49 including a fourth wheel 49*a*, that is meshed with the rotor 44, a third wheel 49*b*, a second wheel (minute designating wheel) 49*c*, a minute wheel 49*d*, and a sliding pinion (hour designating wheel) 49*e*.

A minute hand 50 is connected to the second wheel 49*c*, and an hour hand 51 is connected to the sliding pinion 49*e*. In association with the rotation of the rotor 44, hours and minutes are displayed by these hands 50 and 51, respectively.

Configuration of Contactless IC Module

Figure 5:
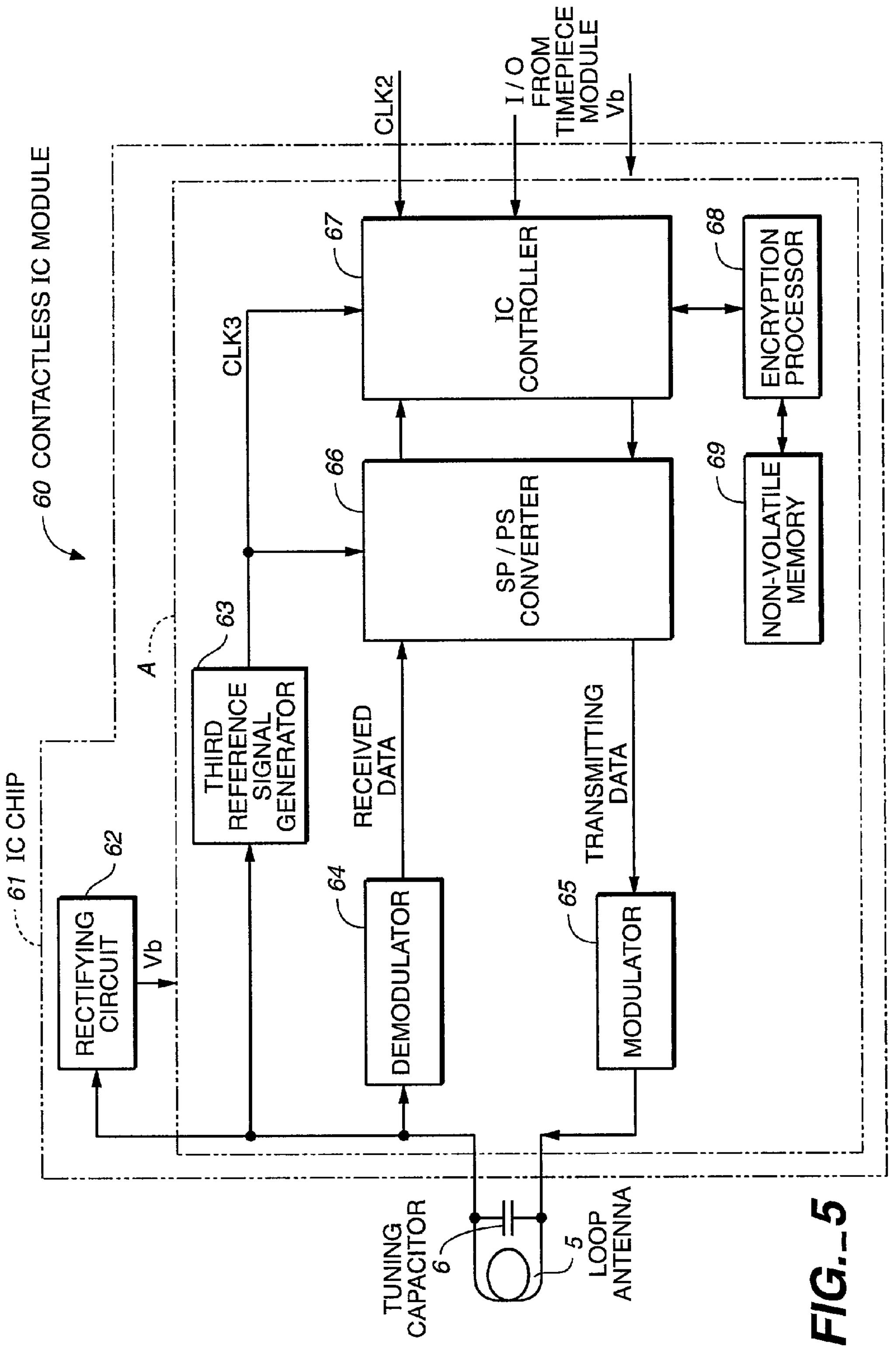
FIG. 5 is a block diagram illustrating the configuration of a contactless IC module of the wrist-watch device according to the same embodiment.

The electrical configuration of the contactless IC module 60 is described below with reference to FIG. 5, which is a block diagram illustrating the contactless IC module 60.

This contactless IC module 60 includes the double-winding loop antenna 5 formed by attaching a copper foil on the circuit board 7 (see FIGS. 2 and 3), the tuning capacitor 6, and the IC chip 61.

In order to increase the antenna efficiency of the loop antenna 5, it is desirable to make the opening area of the loop antenna 5 larger. If the space within the housing 4 permits, the IC chip 61 is preferably formed on the exterior of the loop antenna 5, and then, the communication quality can be improved. The communication distance with the external transceiver 100 can also be increased.

The number of turns of the loop antenna 5 is on the order of a few turns if a frequency in the short-wave band, such as 13.56 MHz, is used for communication. If the long-wave band at 125 kHz or 134 kHz is used for communication, a few tens of turns are used. If the number of turns is a few tens of turns, it is difficult to form the loop antenna 5 by attaching a copper foil pattern on the circuit board because of the lack of space. Accordingly, the loop antenna 5 may be formed three-dimensionally by winding, for example, a copper line. Further, if the microwave band at 2.45 GHz is used as the communication frequency, a microstrip antenna is formed on the circuit board.

The IC chip 61 includes a rectifying circuit 62, a third-reference signal generator 63, a demodulator 64, a modulator 65 (RF portion), an SP/PS converter 66, an IC controller 67, an encryption processor 68, and a non-volatile memory 69.

The third-reference signal generator 63, the demodulator 64, the modulator 65, the SP/PS converter 66, the IC controller 67, the encryption processor 68, and the non-volatile memory 69 form a drive unit A which is driven by receiving the supply voltage Vb output from the rectifying circuit 62.

Upon receiving an induction magnetic field (polling signal) from the external transceiver 100 via the loop antenna 5 and the tuning capacitor 6, the rectifying circuit 62 applies the supply voltage Vb obtained by rectifying the polling signal to the drive unit A. The rectifying circuit 62 is formed of a diode, thereby outputting the half-wave rectified or full-wave rectified supply voltage Vb. This enables the the drive unit A of the contactless IC module 60 to be driven without requiring a power source.

The third-reference signal generator 63 generates a third reference clock CLK3 (for example, 13.56 MHz) from the signal received via the loop antenna 5 and the tuning capacitor 6, and outputs it to the SP/PS converter 66 and the IC controller 67. The demodulator 64 demodulates the signal received via the loop antenna 5 and the tuning capacitor 6, and the demodulated signal is converted into a parallel signal in the SP/PS converter 66 and is then transmitted to the IC controller 67. The modulator 65 modulates the transmitting data that is sent from the IC controller 67 and is serial-converted by the SP/PS converter 66, and supplies the modulated data to the tuning capacitor 6 and the loop antenna 5.

It should be noted that the SP/PS converter 66 is driven based on the reference clock signal output from the third-reference signal generator 63.

The IC controller 67 performs various types of control operations based on the third reference clock CLK3 from the third-reference signal generator 63. This IC controller 67 is provided with conventional microcomputer elements such as a CPU, a RAM, a ROM, etc., (none of which are shown for simplicity). In the ROM, control programs and parameters for performing various types of control operations, such as control processing for transmitting and receiving data to and from the external transceiver 100 by wireless communication are stored. The IC controller 67 then allows data communication between the demodulator 64 and the encryption processor 68 and between the modulator 65 and the encryption processor 68 according to the control programs.

The encryption processor 68 performs encryption processing when receiving non-encrypted data. The encryption processor 68 then supplies the encrypted data to the non-volatile memory 69. The encryption processor 68 also decrypts data read from the non-volatile memory 69 according to an instruction from the IC controller 67, and supplies it to the IC controller 67.

The non-volatile memory 69 is formed of, for example, an EEPROM. The encrypted data supplied from the encryption processor 68 is written into the non-volatile memory 69. Upon receiving an instruction from the IC controller 67, the stored data is read out of the non-volatile memory 69. For example, in the non-volatile memory 69, data corresponding to the payment information for the services, ICCID (IC Card Identification) with which each IC card must be provided, a service provider ID for identifying the corresponding service provider, and so on, are stored.

When this contactless IC module 60 is used as a prepaid train ticket, the data format of the data stored in the non-volatile memory 69 is, for example, such as that shown in FIG. 6. That is, the personal ID of the user, the balance data Da, the service provider ID, etc., are stored in the non-volatile memory 69.

In this non-volatile memory 69, a control program for controlling the entire wrist-watch device 1 is also stored. This control program is rewritable by wireless communication with the external transceiver device 100. Accordingly, the upgrading of the control program and the addition of modules can easily be performed. It is also possible to connect an external wireless device having a communication function similar to the external transceiver device 100 to a personal computer at the user's home, in which case, the control program can be downloaded and installed via a network, such as the Internet. Similarly, a suitable communication interface may be provided, and a control program recorded on a removable recording medium, such as a flexible disk or an optical disc, can be installed.

An overview of the operation performed by the contactless IC module 60 is discussed below.

The IC controller 67 of the contactless IC module 60 detects a digital-modulated (ASK, FSK, or the like) polling signal transmitted in the form of an induction magnetic field from the external transceiver 100 via the loop antenna 5 and the tuning capacitor 6. The IC controller 67 then reads parallel data from a designated memory address in the non-volatile memory 69. The IC controller 67 further performs parallel-serial (PS) conversion on the parallel data read from the memory in synchronization with the modulated signal transmitted to the IC controller 67. Then, the IC controller 67 outputs the obtained serial data as the transmitting data.

The modulator 65 modulates the transmitting data output from the IC controller 67, and sends the transmitting data toward an external wireless device by changing the resonance state of a tank circuit formed by the loop antenna 5 and the tuning circuit 6.

Power is completely supplied from the external wireless device, and the data memory also uses a non-volatile memory, such as an EEPROM or a ferroelectric memory. Accordingly, the contactless IC module 60 is completely battery-less.

Specific Examples for Use

A description is provided below of an example in which the contactless IC module 60 of the wrist-watch device 1 is used as a prepaid train ticket in a contactless automatic ticket system.

In this case, the balance data Da has been written into the non-volatile memory 69, and the determination data D0 has been written into the RAM of the timepiece control unit 14.

Figure 7:
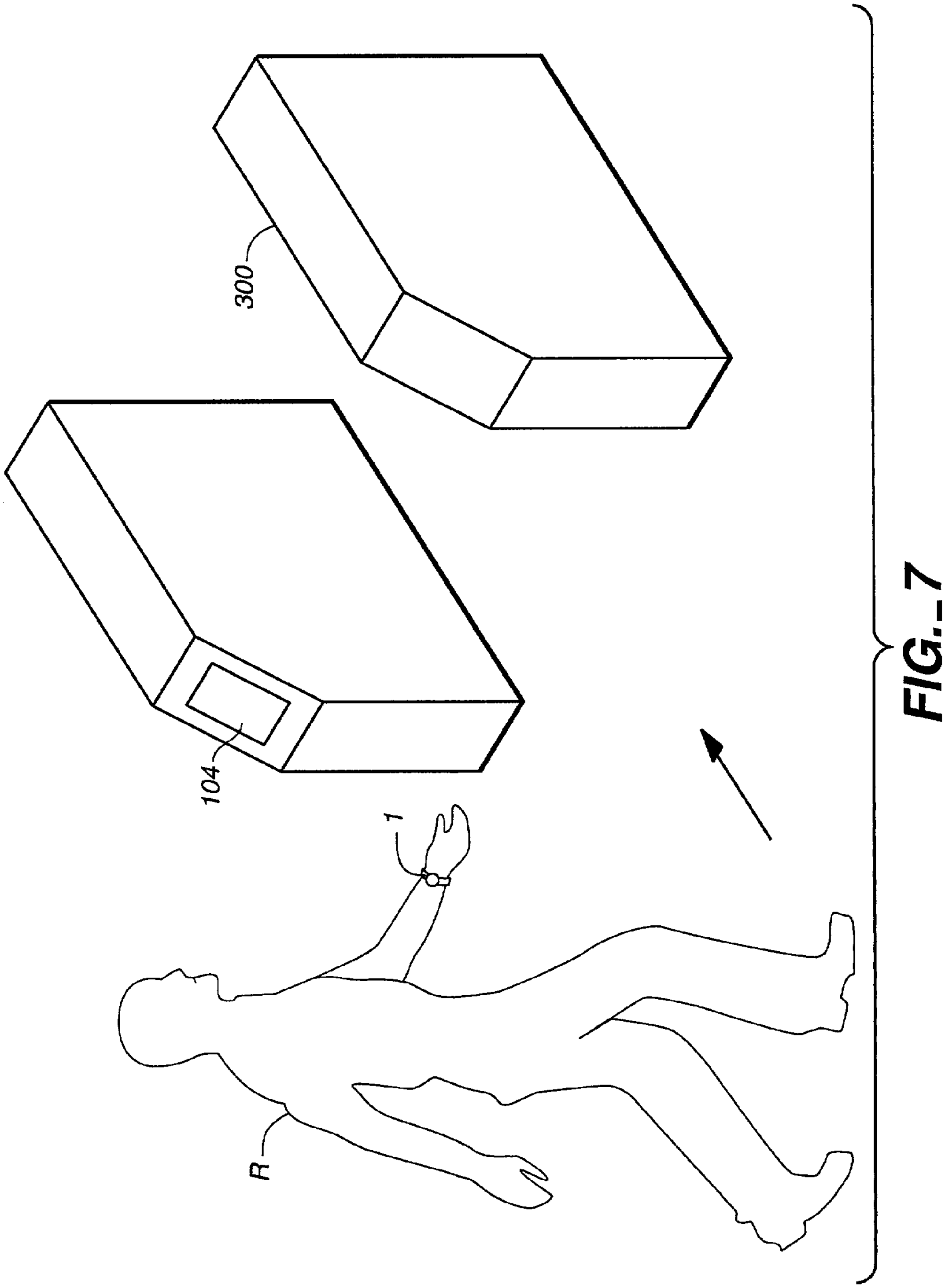
FIG. 7 illustrates the operation when a user with the wrist-watch device of the same embodiment attempts to pass through an automatic ticket gate.

FIG. 7 illustrates that a user R with the wrist-watch device 1 attempts to pass through a contactless automatic ticket machine 300. The contactless automatic ticket machine 300 is provided with the external transceiver device 100.

When the user R approaches the ticket gate of the contactless ticket machine 300, an induction magnetic field (polling signal) transmitted from the antenna 104 of the automatic ticket machine 300 is received by the loop antenna 5 of the wrist-watch device 1. Accordingly, the signal corresponding to the induction magnetic field is rectified in the rectifying circuit 62 so as to generate the supply voltage Vb, thereby driving the drive unit A. The IC controller 67 then stores the data corresponding to the signal according to the control program, and also transmits the data stored in the non-volatile memory 69 from the loop antenna 5.

Thus, the signals are transmitted and received between the non-volatile memory 69 and the controller 101 of the automatic ticket machine 300. Then, the controller 101 of the automatic ticket machine 300 determines whether the user R is able to pass through the ticket gate. As a result, if the information stored in the non-volatile memory 69 of the contactless IC module 60 of the user R is valid, the user R is allowed to pass through the ticket gate. If invalid ticket information (for example, an insufficient balance) is stored, the ticket gate is closed by the movable barrier, and the user R is prevented from passing through the gate.

The balance data Da is written into the non-volatile memory 69 as follows.

When entering the ticket gate, the value corresponding to the minimum fare is subtracted from the value of the balance data Da, and the subtracted value is written as new balance data Da.

When exiting the ticket gate, a subtracted value is obtained by first subtracting the minimum fare from the fare corresponding to the boarding zone, and then subtracting the result from the value of the balance data Da. Then, the subtracted value is written as new balance data Da.

For example, when the minimum fare is $1.40, the fare corresponding to the boarding zone is $3.00, and the amount of the initial credit balance data Da is $10.00, the balance data Da becomes $8.60 when the user enters the ticket gate, and becomes $7.00 when the user exits from the ticket gate.

Operation of the Present Embodiment

Insufficient-Balance Reporting Processing

Figure 8:
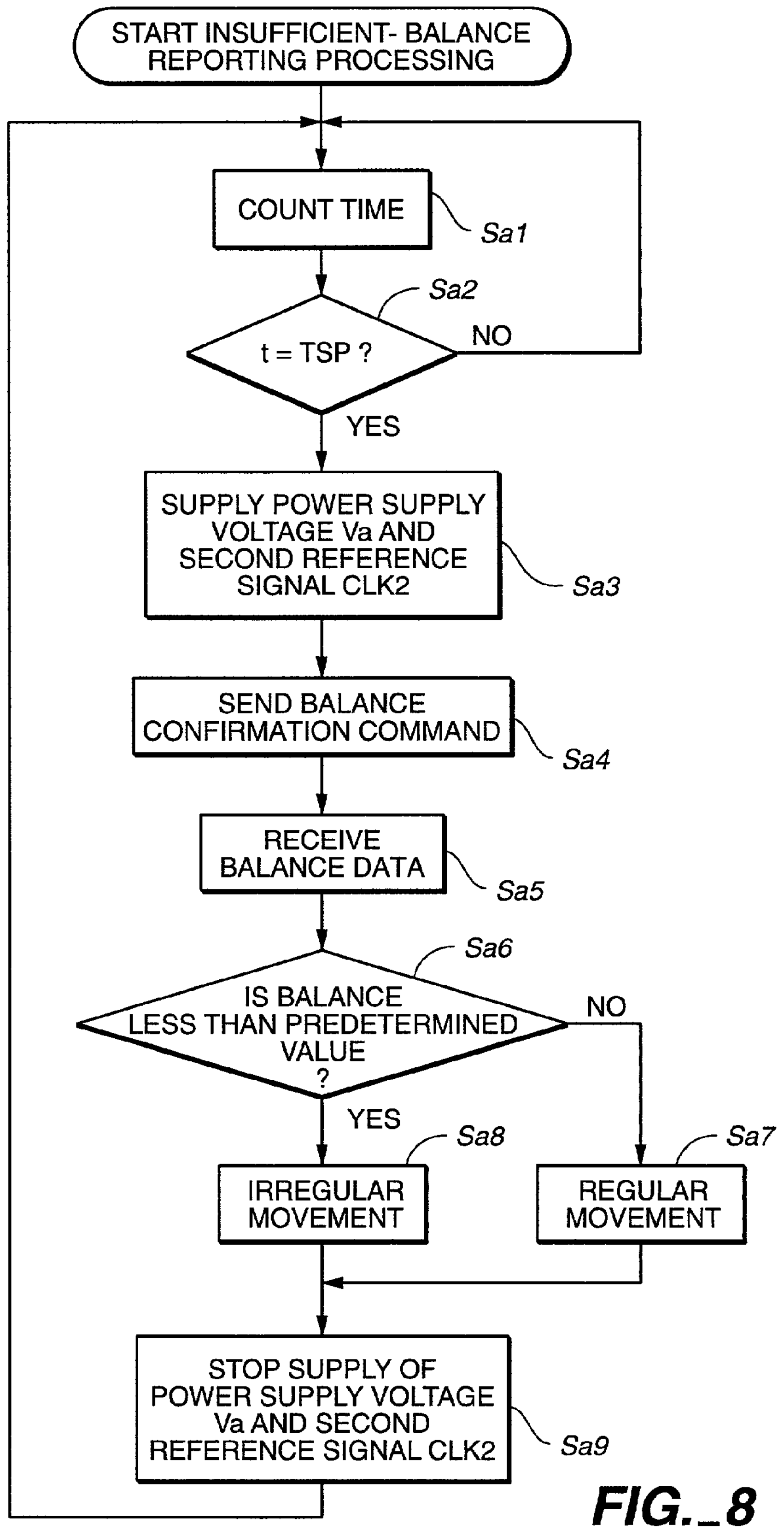
FIG. 8 is a flow chart illustrating an insufficient-balance reporting process according to the same embodiment.

The insufficient-balance reporting processing performed by the timepiece module 10 is described below with reference to the flow chart of FIG. 8.

This insufficient-balance reporting processing is performed at regular intervals of predetermined determination cycle periods TSP. Accordingly, the timepiece control unit 14 counts a predetermined time with an internal timer 14E (step Sa1), and waits until the counted time reaches the end of determination cycle period TSP (step Sa2).

When the timer reaches the end of the determination cycle period TSP (step Sa2; YES), the timepiece control unit 14 supplies the supply voltage Vb obtained by transforming the supply voltage Va from the battery 22 to the contactless IC module 60. Simultaneously, the timepiece control unit 14 outputs the second reference clock CLK2 generated based on the first reference clock CLK1 to the contactless IC module 60 (step Sa3).

Upon receiving the supply voltage Vb and the second reference clock CLK2, the contactless IC module 60 becomes operable.

Then, the timepiece control unit 14 of the timepiece module 10 supplies a balance confirmation command (I/O) to the IC controller 67 (step Sa4).

The IC controller 67 of the contactless IC module 60 receives this balance confirmation command (I/O), and reads out the balance data Da of the non-volatile memory 69. Then, the IC controller 67 transmits the balance data Da to the timepiece module 10.

The timepiece control unit 14 receives the balance data Da (step Sa5). The timepiece control unit 14 then determines whether the balance of the received balance data Da is insufficient for the fare corresponding to the determination data (minimum fare) stored in the RAM (step Sa6).

If the balance is not insufficient (step Sa6; NO), the second-hand moving mechanism 30S is operated to perform the regular time-display operation.

On the other hand, if it is determined that the balance is insufficient (step Sa6; YES), the timepiece control unit 14 receives a signal reflecting this result, and controls the second-hand moving mechanism 30S so that the second hand 40 performs the irregular movement operation, that is, moving once every three seconds.

Then, the timepiece control unit 14 stops the supply of the supply voltage Vb to the contactless IC module 60 (step Sa9). Thereafter, this processing is repeated every determination cycle period TSP.

As a result, the user R is able to easily recognize that the balance becomes insufficient by the irregular movement of the second hand 40.

In this case, for example, in an analog timepiece that performs irregular movement (such as two-second movement) when a driving supply (battery) voltage becomes lower than a predetermined voltage, another type of irregular movement (in the above-described example, five-second movement) may be set in the case for the insufficient balance so as to distinguish it from the reduced-voltage reporting.

Minimum-fare Rewriting Processing

Figure 9:
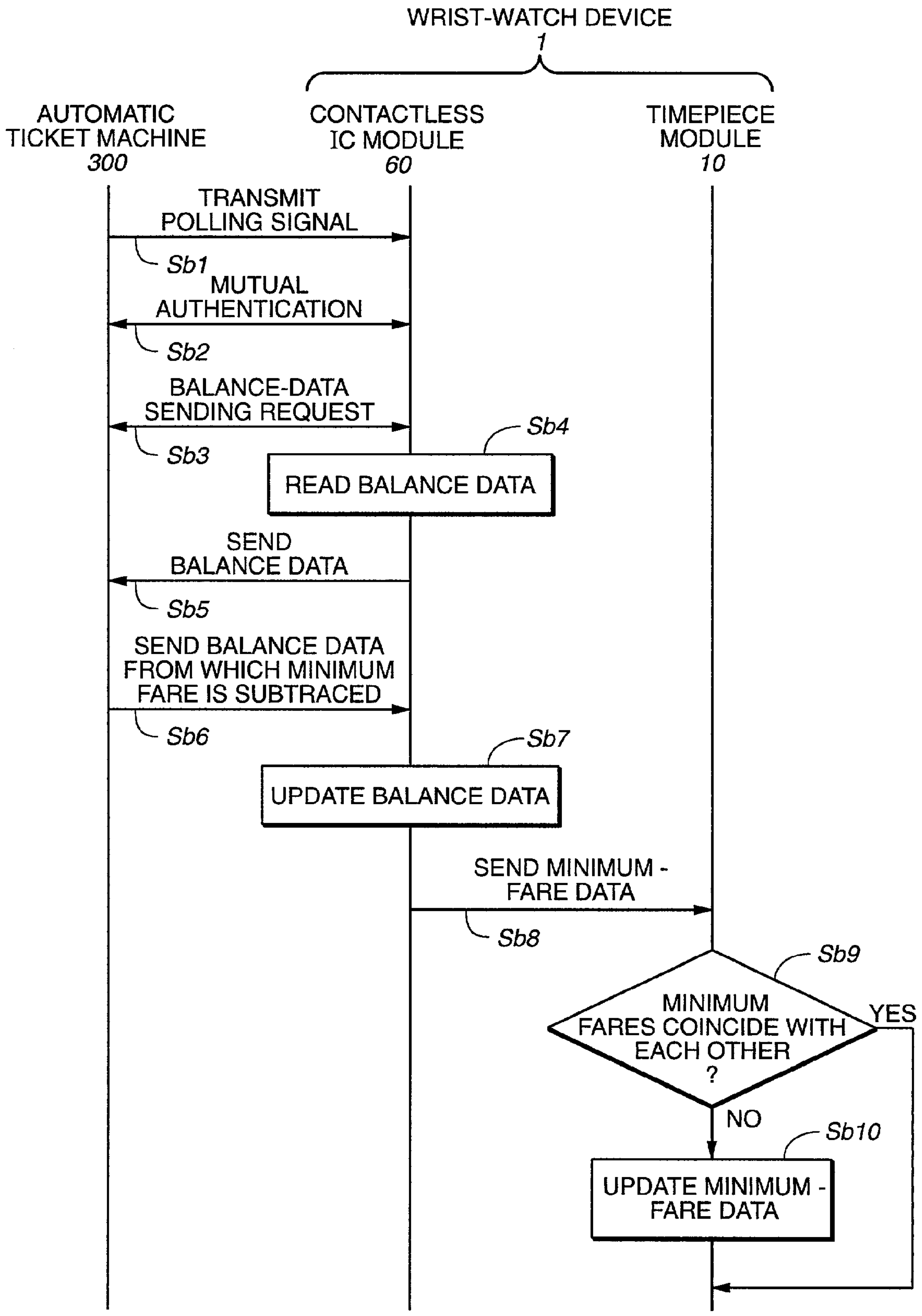
FIG. 9 is a flow chart illustrating a minimum-fare rewriting process according to the same embodiment.

A description is now provided for the minimum-fare rewriting processing with reference to the sequence chart of FIG. 9.

This processing is performed when the user R enters the ticket gate.

As discussed above, when the user R approaches the ticket gate of the automatic ticket machine 300, an induction magnetic field (polling signal) transmitted from the antenna 104 of the automatic ticket machine 300 is received by the loop antenna 5 of the wrist-watch device 1 (step Sb1).

When the polling signal is received by the loop antenna 5, the rectifying circuit 62 supplies the power supply voltage Vb to the drive unit A.

Mutual authentication is performed between the automatic ticket machine 300 and the contactless IC module 60 (step Sb2). This mutual authentication is performed to prevent illegal use by confirming that both the automatic ticket machine 300 and the contactless IC module 60 are authenticated by verifying the encryption key.

Thereafter, the automatic ticket machine 300 requests the contactless IC module 60 to send the balance data (step Sb3).

Upon receiving the balance-data sending request, the IC controller 67 reads the balance data Da from the non-volatile memory 69 (step Sb4). The IC controller 67 then sends the balance data Da to the automatic ticket machine 300 via the loop antenna 5 (step Sb5).

The external transceiver 100 of the automatic ticket machine 300 sends the value obtained by subtracting the minimum-fare data D0 from the value of the received balance data Da to the wrist-watch device 1 as the new balance data Da (step Sb6).

The IC controller 67 updates the received balance data Da by writing it into the non-volatile memory 69 (step Sb7).

The IC controller 67 also transmits the minimum-fare data D0 to the timepiece module 60 (step Sb8).

The timepiece control unit 14 of the timepiece module 10 determines whether the minimum-fare data stored in the RAM coincides with the minimum-fare data D0 sent to the timepiece control unit 14 (step Sb9). Upon this determination, if the minimum-fare data stored in the RAM coincides with the minimum-fare data D0 (step Sb9; YES), this processing is completed.

In contrast, if the two minimum-fare data are different (step Sb9; NO), the timepiece control unit 14 stores the received minimum-fare data D0 in the RAM so as to update the minimum-fare data D0 (step Sb10).

As described above, even if the business organizer has changed the fares, it is possible to report to the user the insufficient balance according to the minimum-fare rewriting processing of this embodiment without any action on the part of the user.

Advantages of the Present Embodiment

According to the foregoing description, in the present invention, when, for example, the balance becomes insufficient for the minimum fare, it is possible to report to the user the insufficient balance by causing the second hand 40 to perform the irregular movement every determination cycle period TSP.

Modified Examples of First Embodiment

First Modified Example

In the first embodiment, an insufficient balance is reported by the irregular movement of the second hand. However, the present invention is not restricted to this arrangement. For example, the second hand 40 may be stopped at the position of the 30th second for a predetermined period so as to inform the user about the insufficient balance. In short, an insufficient balance can be reported by any movement that is different from the regular movement so that it is noticeable by the user.

Figure 10:
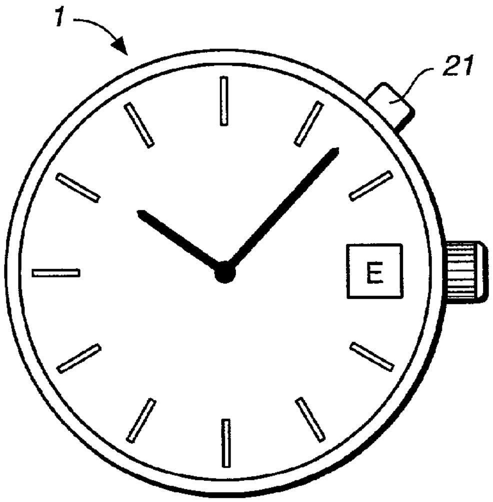
FIG. 10 illustrates that the information regarding an insufficient balance is displayed according to a modified example.
Figure 11:
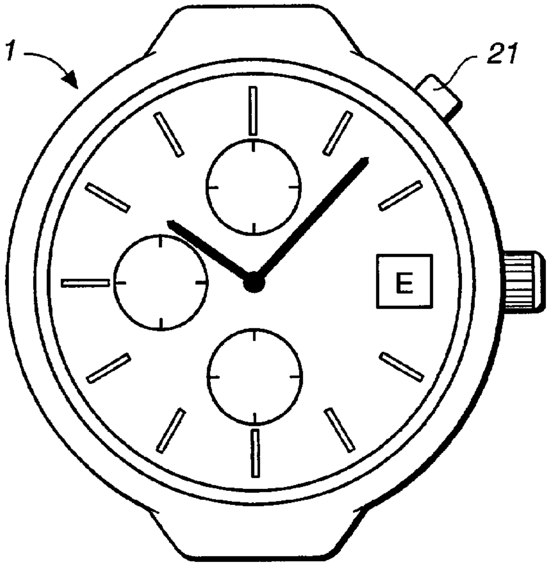
FIG. 11 illustrates that the information regarding an insufficient balance is displayed according to a modified example.

More specifically, in a timepiece device provided with a calendar plate corresponding to the day of the week or the day of the month, i.e., a calendar display portion for sequentially displaying the days of the week or the days of the month, a character "E" (Empty) indicating the insufficient balance may be provided rather than the day of the week or the day of the month on the calendar plate. Thus, "E" may be indicated in the case of the insufficient balance, as shown in FIGS. 10 and 11.

Figure 12:
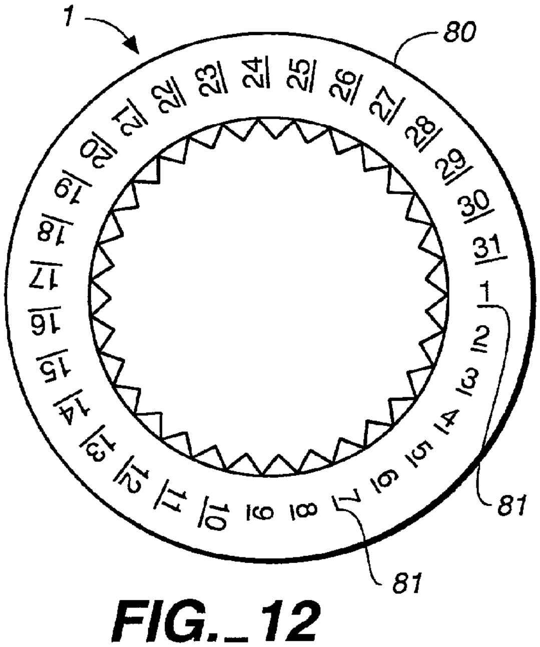
FIG. 12 is a view (one example) illustrating a first modified example of the first embodiment.

FIG. 12 illustrates an example of the calendar plate (day wheel) of a first modified example.

As shown in FIG. 12, a "-" indication 81 is provided near the day of a calendar plate (day wheel) 80 (at the position under the day in FIG. 12). During the normal operation, the number indicating the day is displayed at the center of a calendar display window by a motor, which is separately provided from a regular time-displaying motor (hand-driving motor). In this case, "_" indicating the insufficient balance is not visible to the user.

Figure 13:
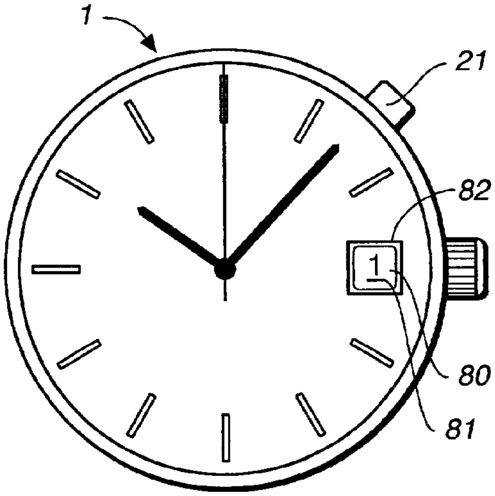
FIG. 13 is a view (second example) illustrating the first modified example of the first embodiment.

FIG. 13 is an external view illustrating a timepiece device having the built-in calendar plate (day wheel) of the first modified example.

In the case of the insufficient balance, as shown in FIG. 13, the calendar plate 80 is driven to move the position of the number indicating the day to a position displaced from the center of the calendar display window by a few degrees i.e., to a position slightly upper than the center of the calendar display window 82. In this case, the "_" indication 81 representing the insufficient balance appears within the calendar display window, and the user is able to easily recognize that the balance is insufficient. In order to enable the user to more reliably identify the insufficient balance, the "_" indication 81 representing the insufficient balance may be displayed in a color different from the number indicating the day. For example, the number indicating the day may be displayed in black, and the "_" indication 81 may be displayed in red.

Alternatively, a character "E" (Empty) indicating the insufficient balance may be provided other than the day of the week or the day of the month on a fixed character plate for displaying the time. During the calendar display mode, the day of the week or the day of the month may be designated by an indicator hand, and in the case of the insufficient balance, the character "E" may be designated by an indicator hand.

Second Modified Example

Although in the first embodiment the minimum-fare data D0 is stored in the timepiece module 10, this data may be stored in the non-volatile memory 69 of the contactless IC module 60.

Third Modified Example

Moreover, the insufficient-balance reporting processing is performed every determination cycle periods TSP. However, this processing may be performed when the user operates the balance display switch 21 (see FIG. 1).

Fourth Modified Example

The light-emitting unit 18 may be provided on the surface of the housing 4, and the insufficient balance may be reported by causing this light-emitting unit 18 to emit light.

Fifth Modified Example

In the foregoing description, the minimum fare is used as the determination data stored in the RAM for performing the balance determination processing. However, this determination data may be changed as desired by the user.

More specifically, the operation mode may be changed to a display threshold setting mode by performing a predetermined operation on the external operation input unit 21. Then, the user operates the external operation input unit 21 to input a desired value of the determination data (balance for the determination processing in the above-described example).

Second Embodiment

The present embodiment is characterized in that the balance is displayed by indicator hands (time display members). In this embodiment, the elements similar to the above-described elements are indicated by like reference numerals, and an explanation thereof will thus be omitted.

In this embodiment, too, the contactless IC module 60 is used as a prepaid train ticket in the contactless automatic ticket system by way of example.

Operation of Second Embodiment

Figure 14:
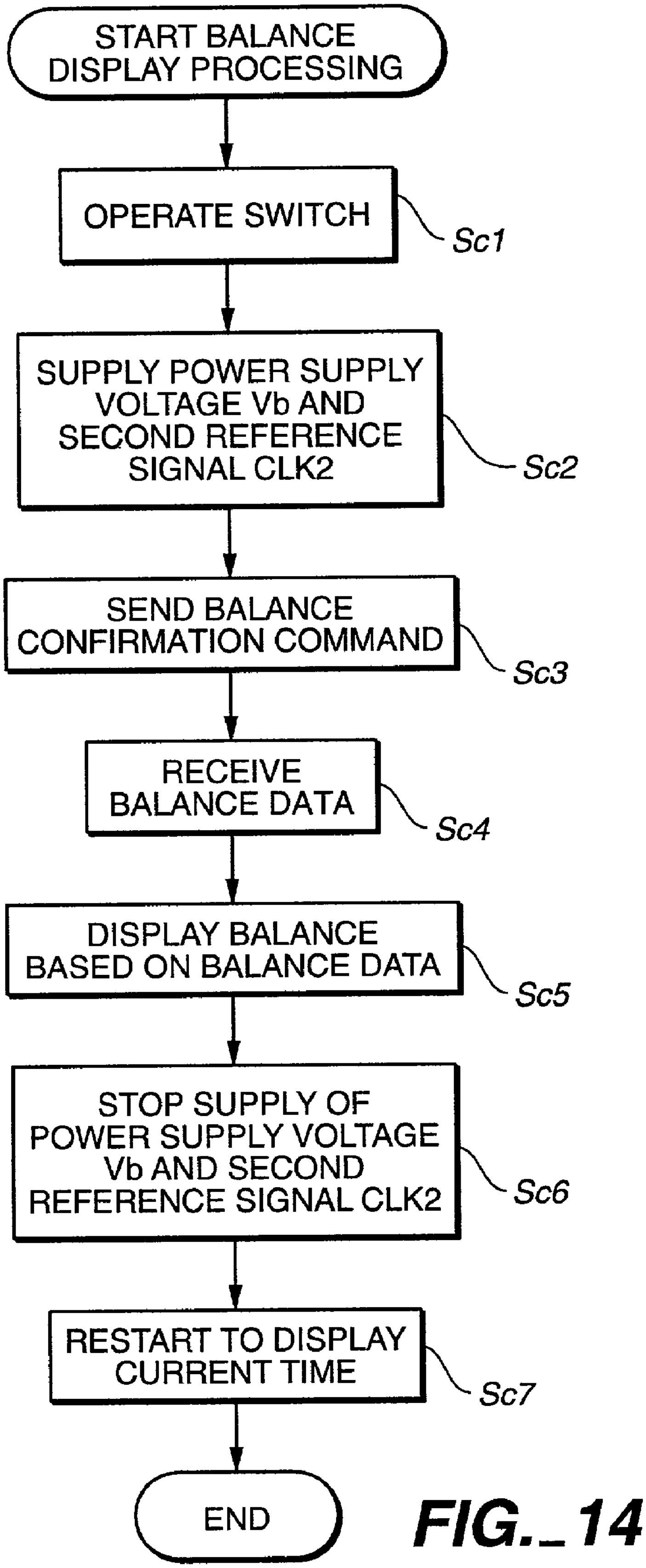
FIG. 14 is a flow chart illustrating a balance display process according to a second embodiment of the present invention.

The balance display processing is described below based on FIG. 14.

This processing is started when the user operates the balance display switch 21 (step Sc1).

In response to an operation performed on the balance display switch 21, the timepiece control unit 14 supplies the power supply voltage Vb from the battery 22 to the contactless IC module 60, and also outputs the second reference clock CLK2 generated based on the first reference clock CLK1 to the contactless IC module 60 (step Sc2).

Upon receiving the power supply voltage Vb and the second reference clock CLK2, the contactless IC module 60 becomes operable.

Then, the timepiece control unit 14 of the timepiece module 10 supplies the balance confirmation command (I/O) to the IC controller 67 (step Sc3).

Upon receiving the balance confirmation command (I/O), the IC controller 67 of the contactless IC module 60 reads out the balance data Da of the non-volatile memory 69, and sends it to the timepiece module 10.

Then, the timepiece control unit 14 receives the balance data Da (step Sc4).

The timepiece control unit 14 sets in a time counter 14A the amount by which the second hand is to be moved according to the balance data Da, and fast-forwards the second hand 40 (or another indicator hand) by the amount of movement. Accordingly, the balance according to the balance data Da is displayed by using the second hand 40 (step Sc5).

Then, the timepiece control unit 14 stops the supply of the power supply voltage Vb and the second reference clock CLK2 to the contactless IC module 60 (step Sc6).

Thereafter, the timepiece control unit 14 restarts the display of the current time (step Sc7).

In this case, the time counter 14A counts down the second hand 40 every second, and when the count value becomes zero, the regular one-second movement is restarted.

Balance Display Examples

First Display Example

The display of the balance using the second hand 40 can be implemented by changing, for example, the duty ratio of the pulses supplied to the second-hand moving mechanism 30S.

Figure 15:
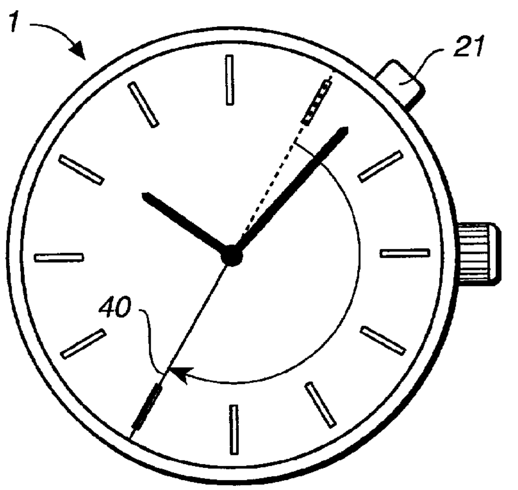
FIG. 15 is a view (first example) illustrating a first display example of the second embodiment.
Figure 16:
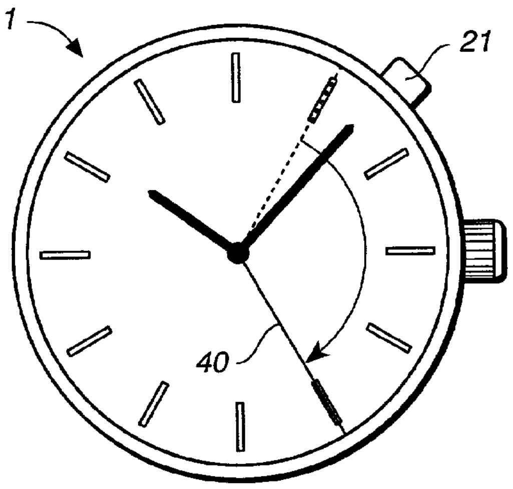
FIG. 16 is a view (second example) illustrating the first display example of the second embodiment.

FIGS. 15 and 16 illustrate examples in which the balance is displayed by using the second hand 40. FIG. 15 illustrates an example when the contactless IC module 60 is unused. FIG. 16 illustrates an example when the balance becomes ⅔.

It is now assumed that the user has operated the balance display switch 21 when the second hand 40 was positioned at the fifth second by the regular movement operation.

When the contactless IC module 60 is unused, the second hand 40 moves from the position at the fifth second to the 35th second, which obtained by adding 30 seconds to the fifth second. When the balance is ⅔, the second hand 40 moves from the position at the fifth second to the 25th second, which is obtained by adding 20 seconds to the fifth second.

As discussed above, in the first display example, the balance is displayed by the distance traveled by the second hand 40.

Second Display Example

Figure 17:
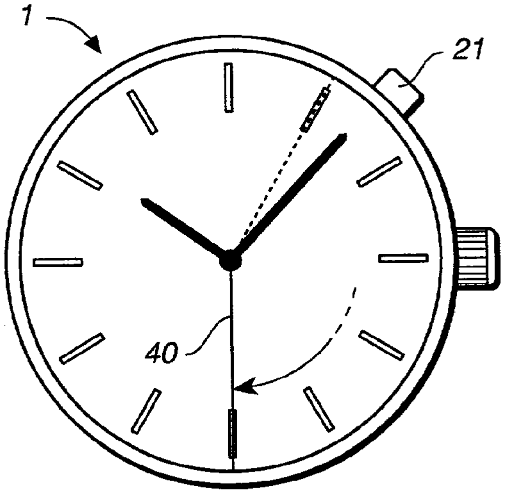
FIG. 17 is a view (first example) illustrating a second display example of the second embodiment.
Figure 18:
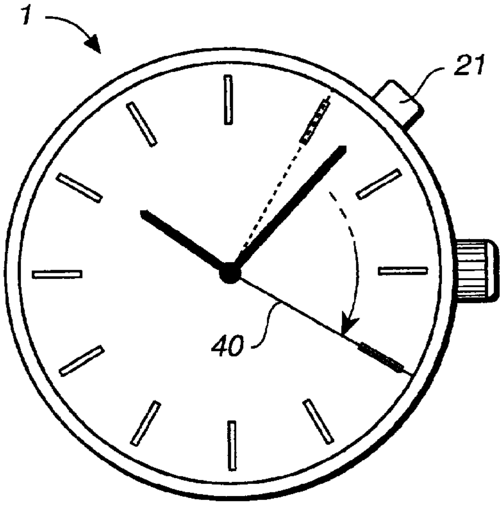
FIG. 18 is a view (second example) illustrating the second display example of the second embodiment.

FIGS. 17 and 18 illustrate examples in which the balance is displayed by the second hand 40. FIG. 17 illustrates an example when the contactless IC module 60 is unused. FIG. 18 illustrates an example when the balance becomes ⅔.

When the contactless IC module 60 is unused, the second hand 40 is moved to the position at the 30th second. When the balance becomes ⅔, the second hand is moved to the position at the 20th second.

As discussed above, in the second display example, the balance is displayed by the position of the second hand 40.

Third Display Example

Figure 19:
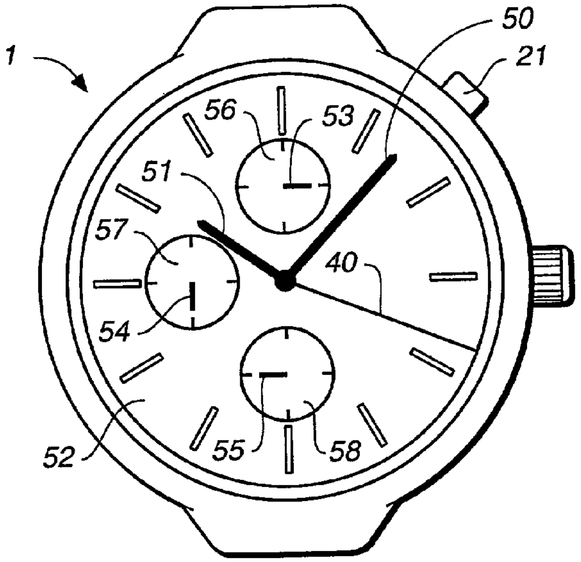
FIG. 19 is a view illustrating a third display example of the second embodiment.

In the wrist-watch device 1 shown in FIG. 19, dials 56, 57, and 58 for displaying 24 hours, the days, and the days of the week by indicator hands 53, 54, and 55, respectively, are separately provided on a dial 52 that also displays the time by the hour hand 51, the minute hand 50, and the second hand 40.

In this case, it is assumed that the indicator hand 53 of the dial 56 indicates the tens of dollars unit place, the indicator hand 54 of the dial 57 indicates the ones of dollars unit place, and the indicator hand 55 of the dial 58 indicates the tens of cents unit place.

It is now assumed, for example, that the positions of the indicator hands 53, 54, and 55 corresponding to the balance are similar to those of the time display, i.e., that “1” is positioned at one o’clock, “2” is positioned at two o’clock, and so on.

With this arrangement, the balance is $36.90 in the example of FIG. 19, with “3”, “6”, and “9” indicated by hands 53, 54, and 55, respectively.

Fourth Display Example

Figure 20:
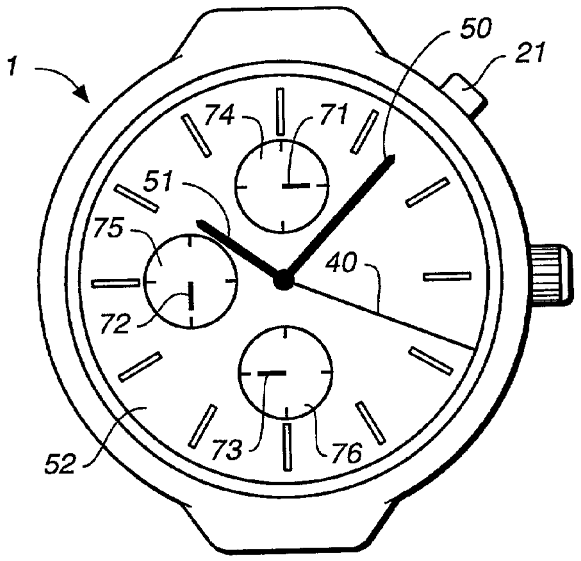
FIG. 20 is a view illustrating a fourth display example of the second embodiment.

The wrist-watch device 1 shown in FIG. 20 is a so-called chronograph (having a stop-watch function). That is, as shown in FIG. 20, dials 74, 75, and 76 for counting 30 minutes, 60 seconds, 12 hours by indicator hands 71, 72, and 73, respectively, are separately provided on the dial 52 that also displays the time by the hour hand 51, the minute hand 50, and the second hand 40. In this case, a plurality of motors are provided for driving the individual indicator hands 51, 50, 71, 72, and 73 in addition to a “second motor” for driving the second hand 40, and the timepiece control unit 14 is adapted to separately control the individual indicator hands.

The 30-minute meter indicates 30 minutes by one cycle of the indicator hand 71, the 60-second meter indicates 60 seconds by one cycle of the indicator hand 72, and the 12-hour meter indicates 12 hours by one cycle of the indicator hand 73.

In this case, it is assumed that the indicator hand 71 of the dial 74 indicates the tens of dollars unit place, the indicator hand 72 of the dial 75 indicates the ones of dollars unit place, and the indicator hand 73 of the dial 76 indicates the tens of cents unit place.

It is now assumed, for example, that the positions of the indicator hands 71, 72, and 73 corresponding to the balance are similar to those of the time display, i.e., that “1” is positioned at one o’clock, “2” is positioned at two o’clock, and so on.

With this arrangement, as in the example of FIG. 19, the balance is $36.90, with “3”, “6”, and “9” indicated by hands 71, 72, and 73, respectively.

Advantages of Second Embodiment

According to the foregoing description, in the second embodiment, the balance is displayed by the second hand or the indicator hands, thereby enabling the user to easily identify the balance.

Modified Examples of Embodiments

The present invention is not restricted to the above-described embodiments, and various modifications may be made, for example, as follows.

First Modified Example

In the above-described individual embodiments, the wrist-watch device 1 is used as a prepaid train ticket. However, the present invention is not limited to this arrangement, and the wrist-watch device 1 may be used as other various types of tickets, such as a ski resort lift pass, an entrance ticket or a boarding ticket in an amusement park, an entrance pass in a cinema, etc.

Second Modified Example

In the above-described individual embodiments, the wrist-watch device 1 is used as a prepaid ticket, and the balance is displayed (balance display) every time the wrist-watch device 1 is used.

However, instead of the balance, an accumulative amount (accumulative number) may be displayed. For example, points are given every time the user passes through the gate or every time the user visits, for example, an amusement park, and the accumulated number of points may be displayed.

Third Modified Example

In the above-described individual embodiments, a power source is not provided in the contactless IC module 60. However, a power source may be provided, and power may be supplied from this power source when performing wireless communication with the external transceiver 100.

Fourth Modified Example

In the above-described individual embodiments, the wrist-watch device 1 is used as a prepaid ticket, and the balance is displayed every time the wrist-watch device 1 is used. However, instead of the balance, the expiry date may be displayed for a ticket having an expiry date, such as a commuter ticket. For example, if the remaining days before the expiry date of the commuter ticket becomes less than a predetermined number of days, the user may be informed by the irregular movement. Alternatively, the expiry date may be displayed when the external operation input unit 21 is operated.

Fifth Modified Example

Figure 21:
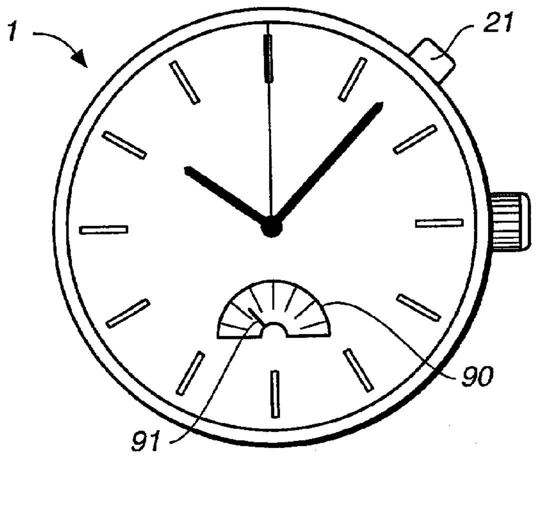
FIG. 21 is a view illustrating a fifth modified example of the second embodiment.

In the above-described individual embodiments, the second hand, i.e., the time display portion, used for the regular time display, is also used as the irregular movement or special display operation. However, as shown in FIG. 21, an independent data-retaining indicator 90 may be provided.

In this case, power is supplied to the contactless IC module 60 with predetermined intervals to check the balance, and the balance is displayed by using an indicator hand 91 of the data-retaining indicator 90. As a result, the user is able to check the balance at any time.

Sixth Modified Example

In the foregoing embodiments, a short-distance wireless communication system used for contactless IC cards has been described as the wireless communication system. However, another type of short-distance wireless communication system, such as a Bluetooth (trade name) system, may be employed.

According to the wrist-watch device having a communication function of the present invention, information corresponding to data (the value or the content of the data) stored in a wireless communication circuit (for example, the remaining amount), or the information of the balance is displayed, thereby enabling the user to easily identify such information.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A wrist-watch device having a wireless communication function, comprising:

a timepiece module including a mechanically driven time display member that displays the time;

a wireless communication circuit that transmits and receives data to and from an external wireless device by wireless communication, said wireless communication circuit including memory that stores non-display data;

a timepiece control unit that controls said time display member to display non-time information in accordance with said stored data;

a timer that counts a predetermined time period and wherein said timepiece control unit is responsive to said timer counting to an end of said predetermined time period for controlling said time display member to display non-time information in accordance with said stored data;

a comparator unit that compares a value of said stored data with a value of predetermined data, and that generates comparison result data; and wherein said timepiece control unit controls said time display member to display non-time information in accordance with said comparison result data;

wherein said time display member comprises a second hand and said timepiece control unit controls said second hand to perform an irregular movement in accordance with said comparison result data;

wherein said timepiece control unit controls said second hand to move a predetermined distance in accordance with said stored data; and wherein said timepiece control unit controls said second hand to restart displaying time after a predetermined period following movement of said second hand said predetermined distance.

2. A wrist-watch device having a wireless communication function according to claim 1, wherein said timepiece control unit controls said second hand to move to a predetermined position in accordance with said stored data.

3. A wrist-watch device having a wireless communication function according to claim 1, wherein said timepiece control unit controls said time display member to display information in accordance with said comparison result data when the value of said stored data is less than the value of said predetermined data, and said timepiece control unit is responsive to an updating signal transmitted from said external wireless device for updating the value of said predetermined data.

4. A wrist-watch device having a wireless communication function according to claim 1, wherein said wireless communication circuit is responsive to a polling signal from the external wireless device for transmitting a communication enable signal indicating that wireless communication is to be performed with the external wireless device.

5. A wrist-watch device having a wireless communication function according to claim 1, further comprising a housing and a switch positioned on said housing and wherein said timepiece control unit is responsive to actuation of said switch for controlling said time display member to display information in accordance with said stored data.

6. A wrist-watch device having a wireless communication function according to claim 1, wherein said time display member comprises a first dial that displays at least one of the day of the week and the day of the month and said timepiece control unit controls said first dial to display information in accordance with said stored data.

7. A wrist-watch device having a wireless communication function according to claim 1, wherein said time display member comprises a first dial that displays time, and a separate second dial that displays at least one of the day of the week and the day of the month and said timepiece control unit controls said second dial to display information in accordance with said stored data.

8. A wrist-watch device having a wireless communication function according to claim 1, wherein said time display member comprises a stop-watch indicator hand and a stop-watch dial that displays measured time, and said timepiece control unit controls said stop-watch indicator hand to display information in accordance with said stored data.

9. A wrist-watch device having a wireless communication function according to claim 1, wherein said wireless communication circuit comprises an IC chip including a communicator that modulates and demodulates data, and a controller that controls individual elements.

10. A wrist-watch device having a wireless communication function according to claim 1, wherein said wireless communication circuit comprises a power supply voltage generator that receives a signal from said external wireless device and that generates a power supply voltage from said received signal, and said timepiece control unit reads data from said wireless communication circuit by using said generated power, and including a battery for powering said time display member to display said non-time information.

11. A wrist-watch device having a wireless communication function according to claim 1, wherein said memory stores prepaid card data.

12. An information display method for use in a wrist-watch device having a wireless communication function, said wrist-watch device comprising a timepiece module including a mechanically driven time display member that displays the time, and a wireless communication circuit that transmits and receives data to and from an external wireless device by wireless communication, said wireless communication circuit including memory that stores non-time data; said information display method comprising the steps of:

reading said stored data from said wireless communication circuit in response to an instruction signal;

comparing a value of said stored data with a value of predetermined data;

generating comparison result data; and controlling said time display member to display non-time information in accordance with said comparison result; and wherein said time display member comprises a second hand, and further comprising:

controlling said second hand to perform an irregular movement in accordance with said comparison result data;

controlling said second hand to move a predetermined distance in accordance with said stored data; and controlling said second hand to restart displaying time after a predetermined period following movement of said second hand said predetermined distance.

13. An information display method for use in a wrist-watch device having a wireless communication function according to claim 12, wherein said wrist-watch device comprises a switch, the method further comprising:

activating said switch; and controlling said time display member to display information in accordance with said stored data in response to activation of said switch.

14. An information display method for use in a wrist-watch device having a wireless communication function according to claim 12, further comprising:

restarting time display after controlling said time display member to display information in accordance with said stored data for a predetermined period.

15. A computer readable medium for storing a control program executable by a computer for controlling a wrist-watch device having a wireless communication function, said wrist-watch device comprising a timepiece module including a mechanically driven time display member that displays the time, and a wireless communication circuit that transmits and receives data to and from an external wireless device by wireless communication, said wireless communication circuit including memory that stores non-time data; said control program executing a method comprising the steps of:

detecting an instruction from an external source;

reading said data from said wireless communication circuit based on said instruction;

comparing a value of said stored data with a value of predetermined data;

generating comparison result data; and controlling said time display member to display non-time information in accordance with said comparison result data; and wherein said time display member comprises a second hand, and further comprising:

controlling said second hand to perform an irregular movement in accordance with said comparison result data;

controlling said second hand to move a predetermined distance in accordance with said stored data; and controlling said second hand to restart displaying time after a predetermined period following movement of said second hand said predetermined distance.

16. A computer readable according to claim 15, wherein said wrist-watch device comprises a switch, the method further comprising:

activating said switch; and said detection of said instruction is in response to activation of said switch.

17. A computer readable according to claim 15, wherein the method further comprises:

restarting time display after controlling said time display member to display information in accordance with said stored data for a predetermined period.

* * * * *